United States Patent [19]

Benvenuto et al.

[11] Patent Number: 5,026,576
[45] Date of Patent: Jun. 25, 1991

[54] METHOD AND COMPOSITION FOR FINISHING STRUCTURAL BUILDING SURFACES

[76] Inventors: Francis S. Benvenuto, 522 West Carson St.; Jeff S. Silva, 23230 Mehden, both of Carson, Calif. 90745

[21] Appl. No.: 437,192

[22] Filed: Nov. 16, 1989

[51] Int. Cl.$^5$ .......................... B05D 3/12; B05D 3/02; B05D 1/36

[52] U.S. Cl. ................................ 427/355; 427/393.6; 427/403; 106/778; 106/791; 106/792; 524/4; 52/741

[58] Field of Search ............... 427/277, 355, 136, 368, 427/393.6, 407.1, 403; 524/4; 106/778, 779, 792; 52/741

[56] References Cited

U.S. PATENT DOCUMENTS

| | | | |
|---|---|---|---|
| 1,270,450 | 6/1918 | Shope | 427/368 |
| 2,115,612 | 4/1938 | McGuffle | 427/368 |
| 4,038,094 | 7/1977 | Bondi | 106/784 |
| 4,218,258 | 8/1980 | Rothberg | 524/4 |
| 4,294,622 | 10/1981 | Brown | 524/5 |
| 4,340,510 | 7/1982 | Howanietz et al. | 524/5 |
| 4,495,228 | 1/1985 | Cornwell | 427/393.6 |
| 4,686,253 | 8/1987 | Struss et al. | 106/409 |
| 4,746,365 | 5/1988 | Babcock et al. | 106/695 |
| 4,762,561 | 8/1988 | Holub et al. | 106/695 |
| 4,846,889 | 7/1989 | Meyer | 524/44 |

Primary Examiner—Michael Lusignan
Assistant Examiner—Diana L. Dudash
Attorney, Agent, or Firm—Charles H. Thomas

[57] ABSTRACT

A method and composition are provided for creating smooth surfaces on building structures, particularly concrete structures. A first constituent is prepared by mixing together quantities of acrylic mortar admix, concrete plaster adhesive, joint compound, hydrated lime and water. The first constituent is mixed with Portland cement at the construction site. The resultant mixture is smoothed onto concrete or wooden surfaces of a building structure, and dries in about an hour to produce a smooth, hard surface.

14 Claims, No Drawings

METHOD AND COMPOSITION FOR FINISHING STRUCTURAL BUILDING SURFACES

BACKGROUND OF THE INVENTION

1. Field of the Invention

The present invention relates to a method and composition for creating a smooth, hard surface finish on building structures, particularly upon structures formed of concrete.

2. Description of the Prior Art

At present many building structures are constructed with large areas of upright and overhead concrete supports. Concrete has been used in the construction of building walls, ceilings and floors for centuries. The use of concrete for large, expansive surface areas of building walls, ceilings and floors is advantageous, since concrete can be internally reinforced with iron or steel, and since concrete, once cured, is impervious to moisture, does not rot, and is not affected by fire, insects or flooding. Concrete is exceptionally durable and is currently widely used in the construction of large public buildings, such as parking garages, office buildings, sports stadiums, convention centers and in other buildings utilized for many different purposes Although concrete has the desirable properties of a construction building material hereinbefore described, it does have a surface finish, which if untreated, is undesirable. The surface finish of unfinished concrete is rough and abrasive. Persons coming into contact with it are subjected to a high risk of receiving cuts, scrapes and skin abrasions. Furthermore, the surface of unfinished concrete is not aesthetically appealing. Also, unfinished concrete is extremely difficult and expensive to paint. The roughness of the surface greatly increases the labor expense involved in painting, due to the extensive time required to paint a given surface area. Moreover, a very large quantity of paint is required to cover a relatively small surface area of concrete.

To alleviate the problems presented by concrete surfaces, at least the interior concrete surfaces of building structures are currently finished with a conventional concrete finishing compound in order to retain the structural benefits of concrete, while masking the surface appearance of concrete within the structures. At present a patching cement mixture is normally utilize in order to fill in holes in concrete surfaces and to improve the surface finish of those portions of the concrete structure which ar visible and with which people are most likely to come into contact. The conventional patching cements that are currently employed are comprised of Portland cement, number 60 grade silica sand, a little water and some glue. The resultant patching cement mixture forms a gritty, paste-like substance prior to curing.

In order for conventional patching cement to adhere to concrete structures to which it is applied, the concrete structures to be finished must first be wetted down with water. The patching compound is then applied with trowels or other tools. When wet, the patching compound is not particularly adherent to the concrete structure, so that a considerable amount of time is required to smooth a conventional patching cement onto a concrete structure s that it will adhere to the structure when dried.

Furthermore, once conventional patching compounds are applied, they dry with a rough, gritty finish. If the surface is to be painted, a concrete structure finished with patching cement must still be sanded so as to increase the surface area which will be covered by a given quantity of paint. This is done to reduce the time required to paint the surface, and to reduce the amount of paint which will be required. Even so, a surface finished in this manner retains a certain grittiness which detracts from its appearance and which makes painting difficult and expensive.

If a surface finished with conventional patching compound is not painted, it takes on a dusty character. That is, conventional patching cements dry in such a manner that a powdery dust is given off when the surface is rubbed or contacted by passing articles, such as articles of clothing. Furthermore, the dusty nature of the dried patching cement is such that many persons experience a dry, unpleasant sensation in their nasal passages while breathing in the vicinity of concrete structures that are finished with conventional patching cement.

Another disadvantage of the use of conventional patching cement is the extensive waste and cleanup which is required. As previously noted conventional patching cements are not particularly adherent to concrete surfaces when they are first applied. As a result, a good portion of the patching cement fails to adhere to an elevated concrete structure, such as a wall or ceiling, and instead falls to the floor. An inordinate quantity of conventional patching cement is therefore required to finish such an upright concrete surface. Moreover, the wasted quantities of patching cement must be cleaned up, thus necessitating a further labor expense.

SUMMARY OF THE INVENTION

A primary object of the present invention is to provide a substance for finishing concrete surfaces of building structures which does not entail the disadvantages of conventional patching cements. The concrete finishing substance of the present invention readily adheres to concrete structures to be finished, even when those concrete surfaces are dry. Consequently, the application of the concrete surface finishing substance of the invention does not require the concrete surfaces to be wetted down prior to application. Also, because the surface finishing substance of the invention readily adheres to dry concrete, it can be applied far more rapidly than conventional patching cement compositions. Indeed, the same workman can apply the finishing substance of the invention to cover an identical area of concrete wall at least four times as fast than is possible using conventional patching cements. This greatly reduces the labor expense involved in the application of the finishing substance to concrete structures.

Because the substance of the invention adheres readily to concrete, very little waste is generated. The substance may be smoothed onto the concrete with a trowel or other smoothing implement, and spreads like a creamy film across the concrete surface. Unlike conventional patching cements, the surface finishing substance of the invention does not produce lumps or masses which fall from upright concrete surfaces. To the contrary, the composition of the invention adheres to9ether as it is applied to the concrete and is easily smoothed as a film across the concrete surface. Thus, waste in the material cost of the substance required to finish a concrete surface is reduced to a negligible amount. Furthermore, the expense of extensive cleanup that is characteristic of the application of conventional patching cements is totally avoided.

The surface produced by the finishing compound of the invention is far superior to that produced with the application of conventional patching cements. The resultant surface finish of a concrete structure is smooth and hard and exhibits neither the grittiness nor the dustiness which has heretofore been characteristic of exposed concrete walls and ceilings.

Due to the superior finish achieved utilizing the compound of the invention, the concrete surfaces to be finished may be colored during the surface finishing process by merely adding a coloring agent to the surface finishing composition. Any conventional cement or mortaring coloring agent may be employed to produce any color desired. Since the concrete surface may be colored during finishing, the subsequent material and labor expense involved with painting can often be totally avoided.

While the surface finishing composition of the invention is extremely beneficial when applied to concrete structures, it also exhibits the same desirable characteristics hereinbefore described when applied to wood surfaces, as well. Thus, the composition of the invention may be utilized to impart a smooth, hard surface finish to wooden panels, such as walls.

The surface finishing substance of the invention is formed of two constituents which may be stored separately from each other for prolonged periods prior to use. The first constituent is a novel composition which has heretofore not been used in conventional patching cements. This constituent is mixed with a second constituent comprised of Portland cement immediately prior to applying the resultant mixture to the surface to be finished. Once the two constituents have been mixed together, the resulting finishing preparation must be applied to the surface to be finished before it dries. While the period between mixing and hardening will vary somewhat with the proportions of the constituents and the quantities of the elements therein, the constituents should be mixed in quantities intended for application to the surface to be finished in about one hour.

In one broad aspect the present invention may be considered to be a surface finishing constituent for building structures comprising a mixture of joint compound, acrylic mortar admix, concrete plastic adhesive, hydrated lime and water. The proportions of the components of this first constituent may vary somewhat. Preferred ranges of quantities of the component elements may be considered with respect to a base amount of the joint compound. When so considered, within the first finishing constituent, for each twenty five pounds of joint compound, acrylic mortar admix is present to the extent of a volume of between about one quart and one gallon. Concrete plaster adhesive is also present in a volume of between about one quart and one gallon, and lime is present in a volume of between about one half and one half gallons. All of the foregoing measurements are volumetric measurements of dry fungible goods. Water is present in a volume of between one half and four liquid gallons.

In the preferred embodiment of the constituent which has been found to be most suitable for finishing concrete surfaces, the acrylic mortar admix and the concrete plaster adhesive are each present in a quantity of about one third of one gallon and the hydrated lime is present in a quantity of about one gallon, for each twenty five pounds of joint compound. Water is preferably added in a quantity which creates a total volume of about five gallons. This normally requires a quantity of about two and one quarter gallons of water.

Once the first constituent has been formulated, it is mixed with a high speed electric mixer. Preferably, mixing is carried out at a mixer speed of at least about fifteen hundred revolutions per minute. The elemental components of the fist constituent can be mixed together using a mixture attachment to a three eighths inch or one half inch electric hand drill. Most such electric drills operate at speeds of up to about seventeen hundred fifty revolutions per minute. Once the component elements of the first constituent have been mixed together, the first constituent has a paste-like consistency comparable to that of cold cream. The first constituent may thereupon be utilized immediately, or stored for prolonged periods of time prior to use.

In another aspect the present invention may be considered to be a structural finishing preparation comprising a first constituent which includes quantities of joint compound, acrylic mortar admix, concrete plaster adhesive, hydrated lime and water mixed with a second constituent comprising Portland cement. The quantity of Portland cement which is added will vary according to weather conditions at the time of application, but preferably is added in the range of between about one quart and one half gallon for each five gallons of the first constituent, formulated as aforesaid.

The resultant structural surface finishing preparation will harden in about one hour. However, it is extremely easy to work with. A single workman can easily apply the foregoing quantity of structural surface finishing preparation within an hour in several, very thin coats. Preferably, a surface to be finished receives about three separate coats of the structural finishing preparation, formulated as described. When the surface preparation dries, it will leave a very smooth finish on either concrete block or cast concrete structures.

The surface finishing preparation of the invention may be applied very easily using trowels and other conventional tools employed by masons for smoothing concrete. The surface finishing preparation is not dusty and the workmen applying it do not need to wear masks of the type often required to apply conventional patching cements to concrete structures. Furthermore, the surface finishing preparation of the invention is totally without sand or grit. The resultant finished surface is thereby extremely smooth, as compared with surfaces finished with conventional patching cements.

Because the finished surface of a structure coated with the surface finishing preparation of the invention is so smooth and dust free, a coloring agent may be mixed in with the first and second constituents prior to application. Any conventional cement and mortar coloring agent, or combination of agents, may be utilized to achieve a desired color and tone.

In the preferred formulation of the surface finishing preparation of the invention a volume of about one third gallon each of acrylic mortar admix and plaster adhesive, a volume of about one half gallon of hydrated lime and about two and one quarter gallons of water are provided for each twenty five pounds of joint compound in the first constituent. The second constituent is preferably comprised of a volume of about one quart of Portland cement, although this amount may be varied to conform to existing weather conditions at the time of mixing.

In another aspect the present invention may be considered to be a method of finishing a building surface.

According to the method a first constituent is prepared by mixing together quantities of acrylic mortar admix, concrete plaster adhesive, joint compound, hydrated lime and water. A first constituent is then mixed with a second constituent comprised of Portland cement. The resulting mixture of constituents is then smoothed onto a surface of a concrete structure to be finished.

As previously noted, the addition of Portland cement is necessary to activate the first constituent. As a consequence, the first constituent can be stored for later use subsequent to preparation. Whether the first constituent is to be used immediately or stored for later use, it is stirred prior to mixing with the second constituent using a high speed electric mixer. That is, the first constituent should be stirred with an electrical mixer at a speed of at least about fifteen hundred revolutions per minute until the first constituent has a smooth homogeneous texture prior to mixing with a second constituent Once it is mixed with the second constituent, the resultant mixture should be smoothed onto the building structure within about an hour from the time that the first and second constituents are mixed together.

Specific examples of the manufacture and use of the surface finishing preparation are described below.

EXAMPLE I

At a construction site at which concrete walls have previously been poured and cured, a twenty pound bag of all purpose non-asbestos USG ready mix joint compound, manufactured by Custom Building Products of Bell, California 90201, is emptied into a five gallon mixing bucket. One third of a gallon of acrylic mortar admix, also manufactured by Custom Building Products is then added to the mixing bucket. One third of a gallon of concrete plaster adhesive (C.P.A.), also manufactured by Custom Building Products, is also added to the mixing bucket. The concrete plaster adhesive is a liquid bonding agent and fortifying admixture designed for use with concrete mortars, ceramic tile grouts and plasters.

One gallon of type S hydrated lime, specification number 301-S manufactured by Chemstar Corporation of San Mateo, California 94404, is then added to the mixing bucket, followed by approximately two and one quarter gallons of water. The contents of the mixing bucket are then thoroughly mixed with a high speed mixer at about 1,750 revolutions per minute. The mixer may be a mixing attachment to a three eighths inch or one half inch electric drill. Upon mixing the contents of the bucket will rise to a volume of approximately five gallons. This completes the formulation and manufacture of the first constituent, which can be stored and, in this condition, will remain moist and uncured for prolonged periods of time.

To immediately treat the concrete wall surface, however, approximately one quarter to one gallon of Portland cement is then added to the mixing bucket and mixed with the electric mixer. The two mixed constituents are then applied as a surface finishing preparation to the concrete surfaces of the walls.

To apply the preparation, trowels or other concrete finishing tools are employed to merely lift the mixed surface finishing preparation from the mixing bucket and spread it on the walls. The surface finishing preparation may be troweled smoothly and will readily adhere to dry concrete surfaces. Preferably, the surface finishing preparation is spread sequentially in three separate coats onto the concrete surface. The surface finishing preparation will then dry and harden about an hour after the two constituents are mixed together to form a smooth, hard surface finish on the concrete walls. The surface finish has an aesthetically pleasing surface texture and is neither dusty nor gritty to the touch.

EXAMPLE II

The steps of Example I are performed with the addition that one pound of True Tone synthetic iron oxide red number III7 cement and mortar coloring, manufactured by the Frank D. Davis Company of Los Angeles, California 90023 is added to the mixing bucket immediately following the addition of the Portland cement. The addition of the cement and mortar coloring agent will produce a surface finish having a rust red coloring.

EXAMPLE III

The constituents of the surface finishing preparation of Example II are mixed as described, and are thereupon applied to vertical plywood wall panel to produce a smooth, splinter free surface.

Undoubtedly, numerous variations and modifications of the invention will become readily apparent to those familiar with structural concrete finishing processes and compositions. Accordingly, the scope of the invention should not be construed as limited to the exemplary composition formulations and procedures described in the foregoing examples, but rather is defined in the claims appended hereto.

We claim:

1. A surface finishing constituent for building structures comprising a mixture of joint compound, acrylic mortar admix, concrete plaster adhesive, hydrated lime and water, wherein for each twenty five pounds of joint compound, acrylic mortar admix is present in a volume of between about one quart and one gallon, concrete plaster adhesive is present in a volume of between about one quart and one gallon, lime is present in a volume of between about one half and one and one half gallons and water is present is a volume of between about one half gallon and four gallons.

2. A surface finishing constituent according to claim 1 wherein said acrylic mortar admix and said concrete plaster adhesive are each present in a quantity of about one third of one gallon and said hydrated lime is present in a quantity of about one gallon.

3. A surface finishing constituent according to claim 2 wherein water is present in a quantity which creates a total volume of about five gallons.

4. A surface finishing constituent according to claim 2 wherein water is present in a quantity of about two and one quarter gallons.

5. A structural surface finishing preparation comprising a first constituent which includes quantities of joint compound, acrylic mortar admix, concrete plaster adhesive, hydrated lime and water mixed with a second constituent comprising Portland cement, wherein said first constituent contains, for each twenty five pounds of joint compound, a volume of between about one quart and one gallon each of acrylic mortar admix and concrete plaster adhesive, a volume of between about one half gallon and one gallon of hydrated lime and a volume of between about one half gallon and four gallons of water.

6. A structural surface finishing preparation according to claim 5 wherein said second constituent is comprised of a volume of between about one quart and one half gallon of Portland cement.

7. A structural surface finishing preparation according to claim 5 wherein said second constituent is comprised of a volume of about one quart of Portland cement.

8. A structural surface finishing preparation according to claim 5 wherein a volume of about one third gallon each of acrylic mortar admix and concrete plaster adhesive, a volume of about one gallon of hydrated lime and a volume of about two and one quarter gallons of water are provided for each twenty five pounds of joint compound in said first constituent.

9. A concrete surface finishing preparation according to claim 5 further comprising a coloring agent.

10. A method of finishing a building surface comprising:

preparing a first constituent by mixing together quantities of a acrylic mortar admix, concrete plaster adhesive, joint compound, hydrated lime and water, wherein for each twenty five pounds of joint compound said first constituent contains a volume of between about one quart and one gallon each of acrylic mortar admix and concrete plaster adhesive, a volume of between about one half gallon and one gallon of hydrated lime and a volume of between about one half gallon and four gallons of water, mixing said first constituent with a second constituent comprised of Portland cement, and smoothing the resultant mixture of constituents onto a surface of a building structure.

11. A method according to claim 10 further comprising storing said first constituent subsequent to preparation.

12. A method according to claim 10 further comprising stirring said first constituent prior to mixing with said second constituent.

13. A method according to claim 10 further comprising stirring said first constituent with an electric mixer at a speed of at least about 1500 revolutions per minute prior to mixing said first constituent with said second constituent.

14. A method according to claim 10 further comprising smoothing said resultant mixture of constituents onto said building structure within about one hour of mixing said first and second constituents together.

* * * * *